United States Patent [19]
Miyake et al.

[11] Patent Number: 5,255,567
[45] Date of Patent: Oct. 26, 1993

[54] TORQUE TRANSDUCER

[75] Inventors: Katsuyuki Miyake, Shiga; Tomoyoshi Sawada, Tsuyama, both of Japan

[73] Assignee: Nippon Densan Corporation, Kyoto, Japan

[21] Appl. No.: 721,147

[22] Filed: Jun. 26, 1991

[30] Foreign Application Priority Data

Jun. 30, 1990 [JP] Japan .................................. 2-69787
Jun. 30, 1990 [JP] Japan .................................. 2-173160
Jun. 30, 1990 [JP] Japan .................................. 2-173161

[51] Int. Cl.[5] .................................. G01L 3/02
[52] U.S. Cl. .................................. 73/862.333; 73/6662.335
[58] Field of Search .................... 73/862.333, 862.334, 73/862.335, 862.336, DIG. 2

[56] References Cited

U.S. PATENT DOCUMENTS

| | | | |
|---|---|---|---|
| 4,817,444 | 4/1989 | Yagi et al. | 73/862.335 |
| 4,873,874 | 10/1989 | Sobel | 73/862.333 |
| 4,885,944 | 12/1989 | Yagi et al. | 73/862.335 |
| 4,899,597 | 2/1990 | Yagi et al. | 73/862.355 |
| 4,907,462 | 3/1990 | Obama et al. | 73/862.335 |
| 5,083,359 | 1/1991 | Aminder et al. | 73/862.333 |

FOREIGN PATENT DOCUMENTS 1-187425 7/1989 Japan .
2-271230 11/1990 Japan .

Primary Examiner—Richard E. Chilcot, Jr.
Assistant Examiner—Elizabeth L. Dougherty
Attorney, Agent, or Firm—McCormick, Paulding & Huber

[57] ABSTRACT

A torque transducer including: a ferromagneto-stricting device provided for a rotational shaft; a magnetic field supply device for supplying a magnetic field to the ferromagneto-stricting device; a sensing device for sensing the change in the magnetic permeability which has taken place due to torque acting on the rotational shaft; a fixed housing for rotatably supporting the rotational shaft via a bearing unit; and an electromagnetic shielding device for surrounding the magnetic field supply device and the sensing device to electromagnetically shield them. The magnetic field supply device comprises an exciting coil, while the sensing device comprises a sensing coil. The electromagnetic shielding device is supported by the fixed housing via an elastic holding member. A seal member is disposed outside the bearing unit. The fixed housing and the electromagnetic shielding device are electrically earthed.

5 Claims, 5 Drawing Sheets

TORQUE TRANSDUCER

FIELD OF THE INVENTION

The present invention relates to an improvement in a non-contact type torque transducer for measuring torque acting on a rotational shaft.

DESCRIPTION OF THE PRIOR ART

A torque transducer is exemplified by a structure disclosed in Japanese Patent Laid-Open No. 63-252487. The conventional torque transducer according to this disclosure is arranged in such a manner that a pair of annular bands are provided for the rotational shaft at a predetermined interval. Each of the annular bands thus-provided has magnetic anisotropy distributed symmetrically to each other. Furthermore, an exciting coil and a sensing coil are disposed to surround the above-described annular bands. The exciting coil is connected to an AC power supply so as to supply a magnetic field to the annular bands. On the other hand, the sensing coil disposed outside the exciting coil senses the change in the magnetic permeability which has taken place due to torque acting on the rotational shaft.

However, the conventional torque transducer encounters the following problems:

A first problem will now be described. In a structure arranged in such a manner that the exciting coil is wound around the exciting bobbin and the sensing coil is wound around the sensing bobbin, the breakage of the exciting coil and/or that of the sensing coil must be prevented. However, a satisfactory means capable of preventing the above-described breakage has not been provided as yet.

SUMMARY OF THE INVENTION

A first object of the present invention is to provide a torque transducer capable of assuredly preventing a breakage of the exciting coil and that of the sensing coil.

Other and further objects, features and advantages of the invention will be appear more fully from the following description.

DETAILED DESCRIPTION OF PREFERRED EMBODIMENTS

Preferred embodiments of a torque transducer according to the present invention will now be described with reference to the drawings.

Figure 1:
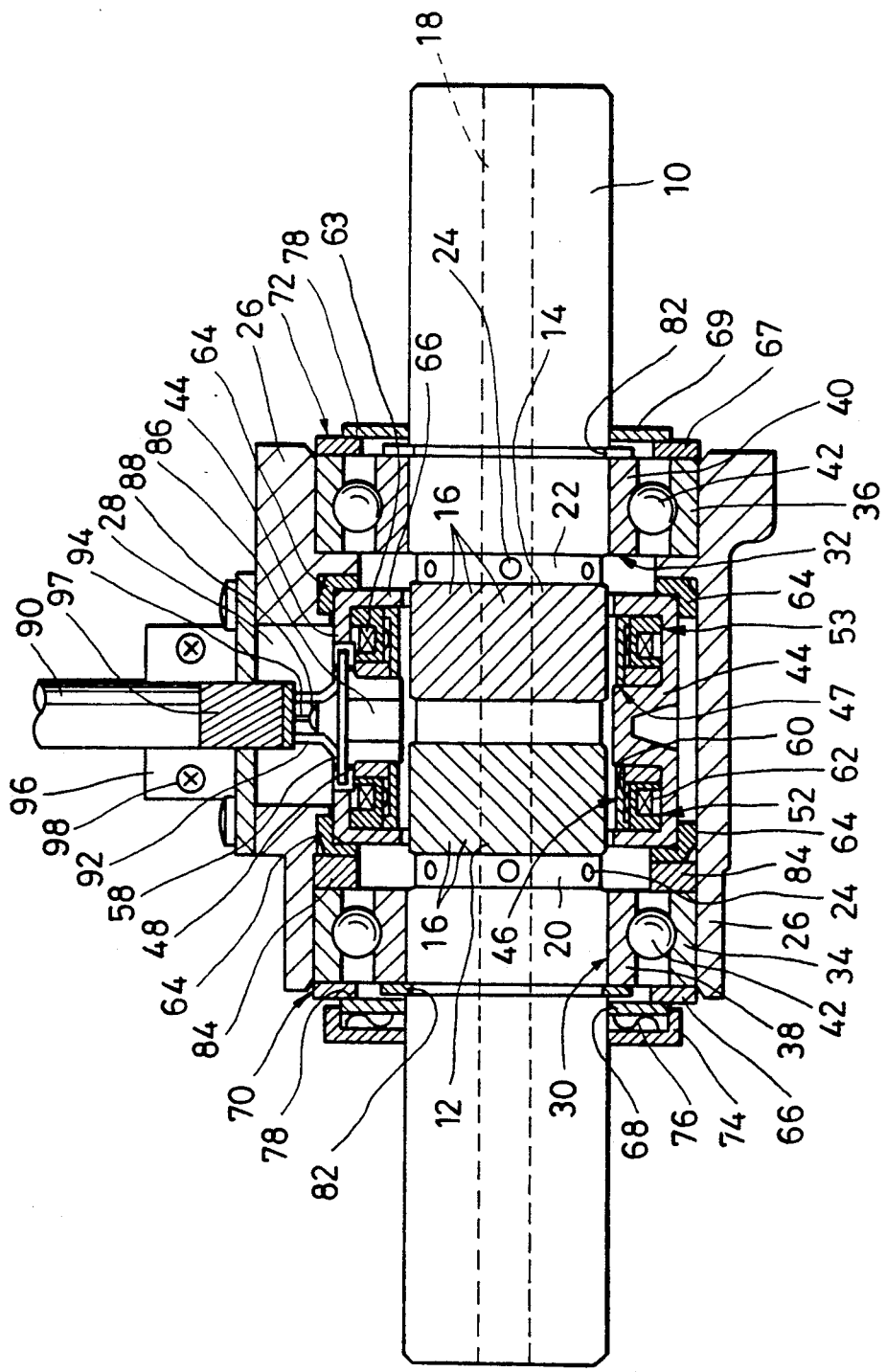
FIG. 1 is a cross sectional view which illustrates an embodiment of a torque transducer according to the present invention.
Figure 2:
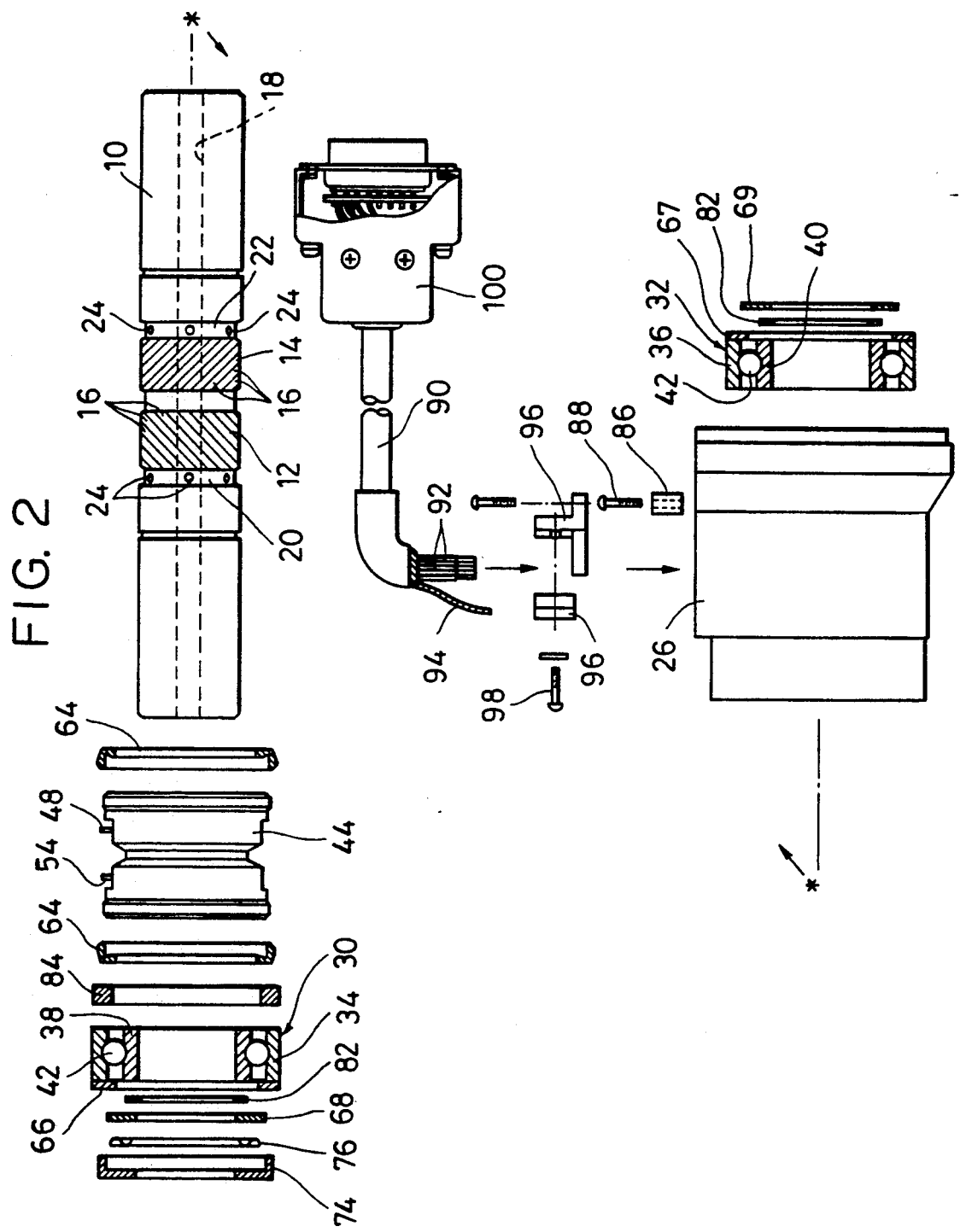
FIG. 2 is a partial cross sectional exploded view which illustrates the torque transducer shown in FIG. 1.

Referring to FIGS. 1 and 2, a torque transducer has a ferromagneto-striction means provided for a rotational shaft 10. Specifically, the rotational shaft 10 is made of nickel maraging steel which is a ferromagneto-strictive material. Annular bands 12, and 14 respectively serving as ferromagneto-striction means are provided for the rotational shaft 10. The annular bands 1 and 14 respectively possess magnetic anisotropy in axisymmetrically helical directions. The annular bands 12 and 14 are disposed around the outer surface of the central portion of the rotational shaft 10 at a predetermined interval. The annular bands 12 and 14 respectively have knurls formed on the outer surface thereof, the knurls being composed of a multiplicity of grooves 16 and respectively making an angle of +45 degrees and an angle of −45 degrees from the axis. As a result of the presence of the knurls thus-formed, residual stress can be generated in the portion in which the knurls are formed. Since the magnitude of the magnetic anisotropy is sufficiently larger than disorder magnetic anisotropy which can be present in the other portions of the rotational shaft 10, the magnetic anisotropy in the other portions can, of course, be neglected. According to this embodiment, the magnetic permeability which changes in accordance with the torque acting on the rotational shaft 10 is sensed in the annular bands 12 and 14. Furthermore, the rotational shaft 10 has a hollow portion 18 penetrating thereto in its axial direction. Outside annular portions 20 and 22 of the annular bands 12 and 14 in the axial direction respectively have 6 oil-holes 24 formed radially at predetermined intervals in the circumferential direction, the oil holes 24 acting to establish the communication between the hollow portion 18 and the external portion. Therefore, the lubricating oil which has passed through the hollow portion 18 is supplied to the outer surface of each of the annular bands 12 and 14 via the oil holes 24.

The necessity for the structure to be arranged in such a manner that the whole body is made of the ferromagneto-strictive material can be eliminated. For example, another structure may be employed in which only the portions in the vicinity of the surfaces, on which the annular bands 12 and 14 are fastened, are made of the ferromagneto-strictive material. As an alternative to this, a ferromagneto-strictive material may be adhered to the surface to form an elongated shape.

The residual stress for giving the magnetic anisotropy may be induced by a mechanical method, a thermal method or another proper method. The magnetic directional characteristics induced by the residual stress may be given to a predetermined portion of the rotational shaft 10 by means of an excessive torsional stress, knurling, grinding, mechanical marking, directional or mask shot-peening, sand blasting or roll crushing, a proper chemical means or a selective heat treatment. It is preferable that the stress applied for the purpose of inducing the residual stress be larger than the estimated maximum stress which will be applied to the subject portion during the use. The reason for this lies in that there is a necessity of preventing the changes in the magnetic anisotropy which will take place in the annular bands 12, and 14 due to the change in the residual stress pattern caused from the torque applied to the rotational shaft during the use.

In the two annular bands 12 and 14, the directional angle of the residual stress made from the axis of the rotational shaft 10 and the resulted directional angle of the axis of easy magnetization are made to be symmetric. The absolute value of them may be ranged from 0° to 90°, preferably 10° to 80°, further preferably 20° to 60°. It is preferable that the two annular bands 12 and 14 be disposed on the members having the same diameter and sufficiently adjacent to each other so as to be applied with the same torque.

The rotational shaft 10 is disposed in such a manner that it penetrates a fixed housing 26. The fixed housing 26 is formed into a substantially cylindrical shape, the fixed housing 26 having a side wall portion in which a through hole 28 is formed. In the fixed housing 26, the annular bands 12 and 14 provided for the rotational shaft 10 and the oil holes 24 are disposed. The rotational shaft 10 is arranged in such a manner that the outer portions of the annular portions 20 and 22 in the axial direction are rotatably held by the fixed housing 26 via a ball bearings 30 and 32. The ball bearings 30 and 32 have outer rings 34 and 36 fastened to the inner surface of the fixed housing 26, inner rings 38 and 40 fastened to the outer surface of the rotational shaft 10 and a plurality of balls 42 interposed between them.

Figure 3:
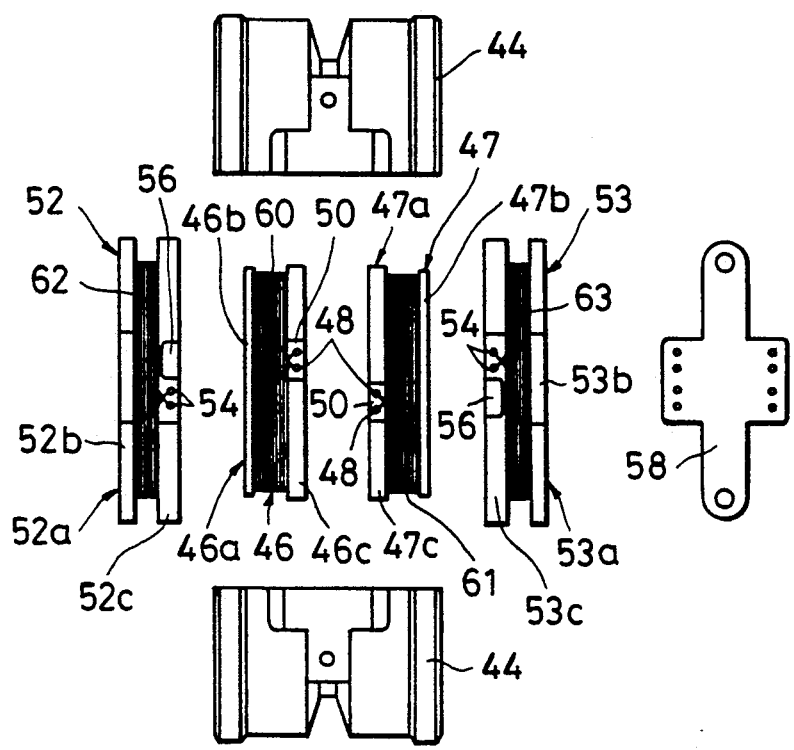
FIG. 3 an exploded plan view which illustrates a state where the torque transducer shown in FIG. 1 is partially exploded.
Figure 4:
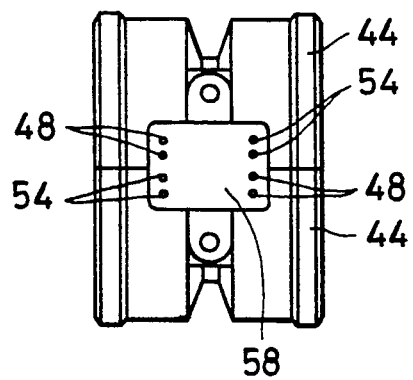
FIG. 4 is a plan view which illustrates the elements in a state where they are assembled.

The fixed housing 26 includes an electromagnetic shielding case 44 made of Permalloy, that is a material possessing a high magnetic permeability. The electromagnetic shielding case 44 includes exciting coil means 46 and 47 and sensing coil means 52 and 53. Referring to FIG. 3, the exciting coil means 46 and 47 (serving as coil means for giving magnetic fields) have exciting coil bobbins 46a and 47a and exciting coils 60 and 61 wound around the bobbins 46a and 47a. The exciting bobbins 46a and 47a comprise cylindrical portions to which the exciting coils 60 and 61 are wound, the cylindrical portions having annular flanges 46b and 46c and annular flanges 47b and 47c projecting outward in the radial direction thereof. Each of the inner annular flanges 46c and 47c has a thickness which is larger than that of each of the outer annular flanges 46b and 47b. Furthermore, a substantially rectangular projecting portion 50 is formed in a portion of each of the annular flanges 46c and 47c thus-arranged. Each of the above-described projecting portions 50 projects outward in the radial direction having, on the end surface thereof, a pair of exciting coil terminals 48 disposed at a predetermined interval in the circumferential direction thereof. Substantially similarly to the exciting coils means 46 and 47, the sensing coil means 52 and 53 have sensing coil bobbins 52a and 53a and sensing coils 62 and 63 wound around the bobbins 52a and 53a. The sensing bobbins 52a and 53a have cylindrical portions to which the sensing coils 62 and 63 are wound. The two end portions of the cylindrical portions have annular flanges 52b and 52c and annular flanges 53b and 53c projecting outward in the radial direction. The inner annular flanges 52c and 53c have larger thickness than that of the outer annular flanges 52b and 53b. The above-described annular flanges 52c and 53c have substantially rectangular cut portions 56 which respectively correspond to the projecting portions 50 of the exciting bobbins 46a and 47a. The annular flanges 52b, 52c, 53b and 53c are respectively subjected to chamfering so as to have substantially the same plane as the end surfaces of the projecting portions 50 of the exciting bobbins 46a and 47a. Furthermore, a pair of sensing coil terminals 54, which are disposed at a predetermined interval in the circumferential direction, are formed in the chamfered portions of the annular flanges 52c and 53c, the pair of sensing coil terminals 54 being formed together with the above-described cut portions 56. A flexible circuit substrate 58 is fastened to the electromagnetic shielding case 44.

According to this embodiment, the electromagnetic shielding case 44 is sectioned into two pieces, the electromagnetic shielding case 44 having, on the inside thereof, a pair of the sensing coil means 52 and 53 secured by adhesion in the axial direction at a predetermined interval. The sensing coil means 52 and 53 are secured by adhesion in a state where the exciting coil means 46 and 47 are concentrically fitted to their inside surfaces. By fitting the exciting bobbins 46a and 47a to the inside surfaces of the sensing bobbins 52a and 53a, the projecting portions 50 are placed in the corresponding cut portions 56 so that the sensing bobbins 52a and 53a and the exciting bobbins 46a and 47a are held while maintaining predetermined positional relationships. As a result, the relative rotation between them can be assuredly prevented. Furthermore, as can be understood from FIGS. 3 and 5, the terminals 48 of the exciting bobbins 46a and 47a and the terminals 54 of the sensing bobbins 52a and 53a are continuously positioned at substantially the same intervals. Therefore, electrical connections to the terminals 48 and 54 can be easily established. Furthermore, according to this embodiment, the terminals 48, to which the two end portions of the exciting coils 60 and 61 are electrically connected, are provided for the exciting bobbins 46a and 47a. Furthermore, the terminals 54, to which the two end portions of the sensing coils 62 and 63 are electrically connected, are provided for the sensing bobbins 52a and 53a. Therefore, the operation for connecting the exciting coils 60 and 61 and the sensing coils 62 and 63 can be easily completed. Furthermore, the breakages of the coils 60, 61, 62 and 63 can be satisfactorily prevented. In addition, the operation for fitting the exciting bobbins 46a and 47b and the sensing bobbins 52a and 53a can be easily completed.

The electromagnetic shielding case 44 is held in the fixed housing 26 via an annular holding member 64 in such a manner that the electromagnetic shielding case 44 is secured in the axial and radial directions.

In the two ball bearings 30 and 32, fixed annular plates 66 and 67 are fixed to a portion outside the outer rings 34 and 36 in the axial direction. Furthermore, rotational annular plates 68 and 69 capable of integrally rotating with the rotational shaft 10 are disposed outside the above-described fixed annular plates 66 and 67. It is preferable that the fixed annular plates 66 and 67 and the rotational annular plates 68 and 69 respectively be made from porous materials. According to this embodiment, they are made from a porous sintered alloy. The fixed annular plates 66 and 67 (their inner peripheral portions) and the rotational annular plates 68 and 69 (their outer peripheral portions) are disposed to overlap each other. As a result, seal means 70 and 72 are constituted which allow the introduction of oil (liquid lubricating material) supplied through the oil hole 24 and prevent the invasion of foreign matters into the ball bearings 30 and 32 from an external portion.

Either of the seal means 70 (the left-hand element when viewed in FIG. 1) has a pre-load supply means on the outer portion in its axial direction. Referring to the drawing, the pre-load supply means comprises a belleville spring 76. An annular holder 74 formed into a hook lateral cross sectional shape is fastened to the rotational shaft 10, the holder 74 accommodating the belleville spring 76. Therefore, the belleville spring 76 acts on the outer surface of the rotary annular plate 68. As a result, the inner surface of the outer portion of the above-described rotary annular plate 68 is elastically pressed against the outer surface of the inner portion of the fixed annular plate 66. Therefore, the interval between the annular overlap portions 78 is adjusted in such a manner that they cannot excessively separate from each other. Furthermore, the above-described pre-load supply means simultaneously supplies the pre-load to the ball bearings 30 and 32. Although the seal means 72 disposed in the right-hand portion of FIG. 1 is not provided with the pre-load means, it may also, of course, be provided.

Figure 7:
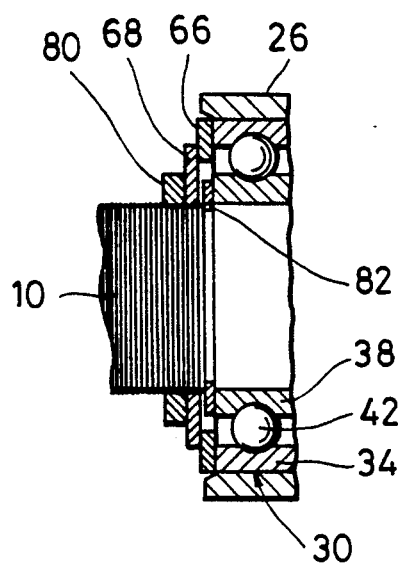
FIG. 7 is a partial cross sectional view which illustrates a first modification to the torque transducer.
Figure 8:
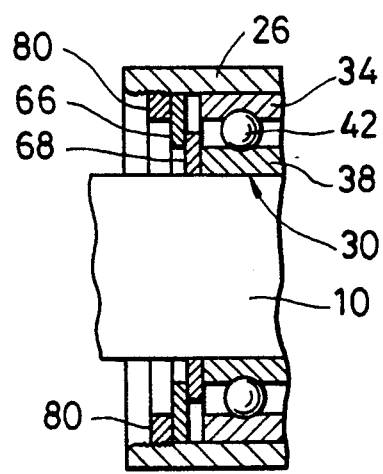
FIG. 8 is a partial cross sectional view which illustrates a second modification to the torque transducer.

According to this embodiment, the interval adjustment of the annular overlap portions 78 is performed by using the belleville spring 76. However, an annular holding member 80 received, as shown in FIG. 7, by the rotational shaft 10 may be used to supply a pre-load and adjust the interval. Furthermore, another structure as shown in, for example, FIG. 8 may, of course, be employed in which the rotational annular plate 68 is disposed on the inside in the axial direction to come in contact with the inner ring 38 of the ball bearing 30 and the fixed annular plate 66 is secured to the fixed housing 26 to annularly overlap the outer portion of the rotary annular plate 68.

A C-ring 82 fitted, from an outer portion, into the groove portion formed in the rotational shaft 10 is disposed outside the ball bearings 30 and 32 in the axial direction. Furthermore, an annular spacer 84 is disposed between the ball bearing 30 disposed in the left-hand portion of FIG. 1 and the holding member 64.

Figure 5:
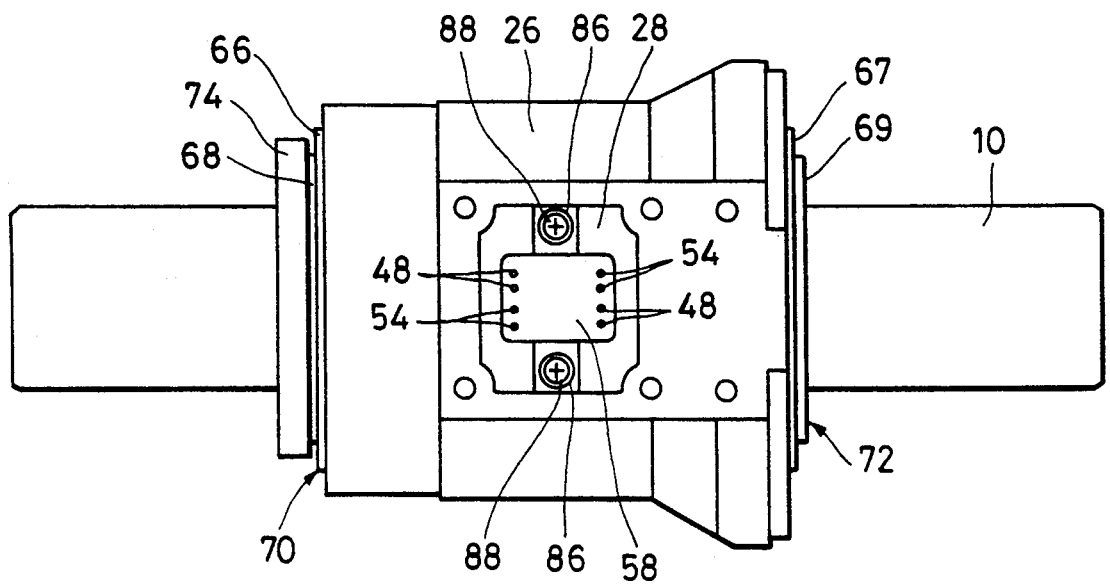
FIG. 5 is a plan view which illustrates the torque transducer shown in FIG. 1.

Mainly referring to FIGS. 2 and 5, rotation-stoppers 86 made of a conductive material and through each of which a thread hole is formed are fastened to the electromagnetic shielding case 44. The flexible circuit substrate 58 is interposed between the above-described stopper 86 and the electromagnetic shielding case 44 before they are fixed by a screw 88 made of a conductive material. Each of the stoppers 86 is disposed to project into the through hole 28 and come in contact with the confronting side surfaces of the through hole 28. As a result, the circumferential directional rotation of the electromagnetic shielding case 44 with respect to the position of the fixed housing 26 can be prevented. An earth mechanism comprises a shielded cable 90 and an earth cable 94. The earth cable 94 is electrically connected to the electromagnetic shielding case 44 via the stopper 86 and the screw 88, while a lead cable 92 is connected to a required position in the flexible circuit substrate 58. The shielded cable 90 is pulled out through the through hole 28. The shielded cable 90 is held by the fixed housing member 26 via a cable retainer 96 secured to the fixed housing 26. As a result, also the shielded cable 90 is earthed. The cable retainer 96 is secured by a fastening screw 98. A connector 100 is disposed in another end portion of the shielded cable 90. The shielded cable 90, the lead wire 92, the earth cable 94, the cable retainer 96 and the fastening screw 98 are omitted from FIG. 5.

Figure 6:
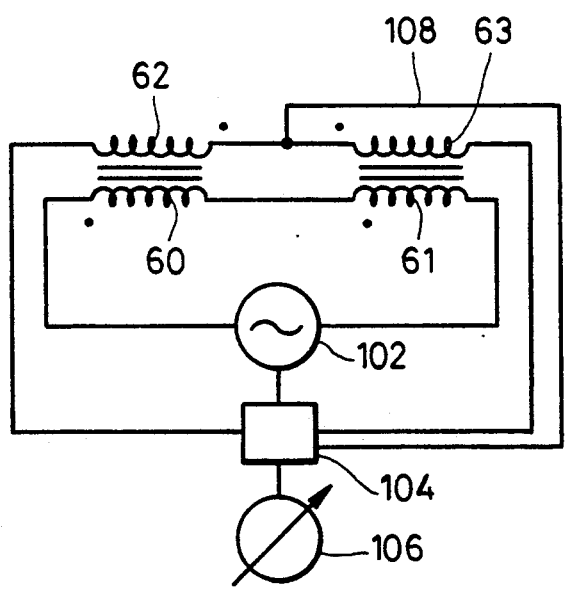
FIG. 6 is a circuit diagram which schematically illustrates the circuit for the torque transducer shown in FIG. 1.

FIG. 6 illustrates an example of a torque detection circuit. The exciting coils 60 and 61 are in series connected in the same direction and driven by an AC power supply 102. The sensing coils 62 and 63 are in series connected in such a manner that their directions are inverted for the purpose of sensing the difference in the magnetic flux between the two annular bands 12 and 14. Power is supplied from the AC power supply 102 to the exciting coils 60 and 61, while the electromotive force induced by the sensing coils 62 and 63, which are connected in opposite directions, is displayed on a voltage display 106 after it has been rectified by a rectifier 104. Reference numeral 108 represents an adjustment line pulled out through a portion between the two sensing coils 62 and 63. Black dots denote the polarities of the coil.

When no torque is applied to the rotational shaft 10, substantially no output signal is generated from the rectifier 104 even if AC currents are supplied to the exciting coils 60 and 61 because the stress of the annular band 12 and that of the annular band 14 are symmetric and the same. In this case, the magnetic permeability of the annular band 12 and that of the annular band 14 are the same, the voltage levels induced by the two sensing coils 62 and 63 are the same and their polarities are opposite. Therefore, they are cancelled each other.

However, when torque is applied to the rotational shaft 10, the annular bands 12 and 14 respectively are subjected to the tensile stress and compression stress. As a result, the magnetic permeability of either the annular band 12 or 14 is increased, while that of the other annular band is reduced. Therefore, the magnetic flux passing through either the annular band 12 or 14 is enlarged, while that passing through the other annular band is reduced. Therefore, the voltage level induced by either the sensing coils becomes higher than the induced voltage of the other sensing coil. As a result, an output signal corresponding to the difference between the induced voltage levels, that is, an output signal which is in proportion to the applied torque, is obtained. The output signal thus-obtained is, by the rectifier 104, converted into DC voltage which corresponds to the torque value. The polarity of the output from the rectifier 104 shows the direction, that is, clockwise or counterclockwise, is shown.

Since the rotational shaft 10 is, via the ball bearings 30 and 32, rotatably held by the fixed housing 26 in the portions outside the two annular portions 20 and 22 in the axial direction, relative deflections of at least the portions of the rotational shaft 10, in which the annular bands 12 and 14 are disposed, with respect to the position of the fixed housing 26 can be substantially prevented.

The ball bearings 30 and 32 are assuredly lubricated in such a manner that the oil is supplied through the oil holes 24 via the hollow portion 18 formed in the rotational shaft 10 so that the oil is supplied into the fixed housing 26. Then, the oil thus-supplied passes through tracks for balls 42 of the ball bearings 30 and 32 before it passes through the rotational annular plats 68 and 69 and/or the fixed annular plates 66 and 67 of the seal means 700 and 72 by penetration. As an alternative to this, the oil passes through the annular overlap portions 78 before it is discharged from the fixed housing 26. Furthermore, the invasion of foreign matters into the ball bearings 30 and 32 can be prevented by the above-described seal means 70 and 72. The prevention of the invasion of foreign matters can be assuredly established by adjusting the interval of the annular overlap portions 78 by changing the pre-loading state made by the above-described pre-load supply means.

The stopper 86 secured in the through hole 28 by the screw 88 connects the electromagnetic shielding case 44 and the earth cable 94 to each other. Furthermore, the circumferential directional rotation of the electromagnetic shielding case 44 with respect to the position of the fixed housing member 26 can be prevented. As a result, the value of the torque acting on the rotational shaft 10 can be stably detected. In addition, damage of the lead wire 92 and the earth cable can be prevented.

Furthermore, in a case where the necessity of preventing the invasion of foreign matters can be eliminated, the seal means 70 and 72 disposed outside the ball bearings 30 and 32 can be omitted from the structure.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed

We claim:

1. A torque transducer comprising:
   ferromagneto-stricting means provided on a rotational shaft acting to change the magnetic permeability in accordance with torque acting on the rotational shaft;
   magnetic field supply coil means for supplying a magnetic field to the ferromagneto-stricting means;
   a magnetic field supply coil bobbin for the magnetic field supply coil means to dispose the magnetic field supply coil means concentric the rotational shaft;
   sensing coil means for sensing a change in magnetic permeability due to the torque acting on the rotational shaft and converting the change into an electrical signal which corresponds to the magnitude of the torque;
   a sensing coil bobbin for the sensing coil means to dispose the sensing coil means concentric the rotational shaft, the sensing coil bobbin separately formed from the magnetic field supply coil bobbin for the magnetic field supply coil means;
   a fixed housing for rotatably holding the rotational shaft via bearing means; and
   electromagnetic shielding means for surrounding and electromagnetically shielding the magnetic field supply coil means and the sensing coil means,
   one of the magnetic field supply coil bobbin and the sensing coil bobbin being a large-diameter bobbin and the other being a small-diameter bobbin having a smaller diameter than the large-diameter bobbin, the large-diameter bobbin and the small-diameter bobbin being disposed to overlap each other radially, the coil means would on the large-diameter bobbin being supported by the fixed housing via the large-diameter bobbin and the electromagnetic shielding means, and the coil means wound on the small-diameter bobbin being supported by the fixed housing via the small diameter bobbin, the large-diameter bobbin, and the electromagnetic shielding means.

2. A torque transducer according to claim 1 wherein each of the large-diameter bobbin and the small-diameter bobbin has a cylindrical portion on which the coil means is wound and a pair of annular flanges provided at both ends of the cylindrical portion, the annular flanges on the same side of the large-diameter bobbin and the small-diameter bobbin having terminals to which the coil means would thereon are electrically connected, the large-diameter bobbin providing a cut portion near another portion of the large-diameter bobbin on which the terminal of the large-diameter bobbin is formed so that when the large-diameter bobbin and the small-diameter bobbin are disposed to overlap each other radially, the terminal of the small diameter bobbin is projected through the cut portion and is positioned in proximity to the terminal of the large-diameter bobbin.

3. A torque transducer comprising:
   ferromagneto-stricting means provided in a rotational shaft and acting to change a magnetic permeability in accordance with torque acting on the rotational shaft;
   magnetic field supply coil means for supplying a magnetic field to the ferromagneto-stricting means;
   a magnetic field supply coil bobbin for the magnetic field supply coil means for disposing the magnetic field supply coil means concentric the rotating shaft, the sensing coil bobbin formed separately from the magnetic field supply coil bobbin;
   a fixed housing for rotatably holding the rotational shaft via bearing means;
   electromagnetic shielding means for surrounding and electromagnetically shielding the magnetic field supply coil means and the sensing coil means,
   one of the magnetic field supply coil bobbin and the sensing coil bobbin being composed of a large-diameter bobbin and the other being composed of a small-diameter bobbin having a smaller diameter than the large diameter bobbin, the large-diameter bobbin and the small-diameter bobbin being mounted so as to overlap each other radially, and a lubricant oil hole being provided which communicates through a space between the rotating shaft and the fixed housing and a space between the rotating shaft and the small-diameter bobbin.

4. A torque transducer comprising:
   ferromagneto-stricting means provided on a rotational shaft acting to change the magnetic permeability in accordance with torque acting on the rotational shaft;
   magnetic field supply coil means for supplying a magnetic field to the ferromagneto-stricting means;
   a magnetic field supply coil bobbin for the magnetic field supply coil means to dispose the magnetic field supply coil means concentric the rotational shaft;
   sensing coil means for sensing a change in magnetic permeability due to the torque acting on the rotational shaft and converting the change into an electrical signal which corresponds to the magnitude of the torque;
   a sensing coil bobbin for the sensing coil means to dispose the sensing coil means concentric the rotational shaft, the sensing coil bobbin separately formed from the magnetic field supply coil bobbin for the magnetic field supply coil means;
   a fixed housing for rotatably holding the rotational shaft via bearing means;
   electromagnetic shielding means for surrounding and electromagnetically shielding the magnetic field supply coil means and the sensing coil means, the fixed housing and the electromagnetic shielding means being electrically earthed,
   one of the magnetic field supply coil bobbin and the sensing coil bobbin being a large-diameter bobbin and the other being a small-diameter bobbin having a smaller diameter than the large-diameter bobbin, the large-diameter bobbin and the small-diameter bobbin being disposed to overlap each other radially, the coil means would on the large-diameter bobbin being supported by the fixed housing via the large-diameter bobbin and the electromagnetic shielding means, the coil means wound on the small-diameter bobbin being supported by the fixed housing via the small diameter bobbin being supported by the fixed housing via the small diameter bobbin, the large-diameter bobbin, and the electromagnetic shielding means; and a lubricant oil hole being provided which communicates through a space between the rotating shaft and the fixed housing and a space between the rotating shaft and the small-diameter bobbin.

5. A torque transducer according to claim 4, wherein the fixed housing defines a through hole providing a path for a conductive cable to communicate with the sensing coil means, the conductive cable providing a path so as to electrically ground both the electromagnetic shielding means and the fixed housing, and means for attaching the electromagnetic shielding means and the fixed housing so as to prevent relative rotation.

* * * * *

UNITED STATES PATENT AND TRADEMARK OFFICE
CERTIFICATE OF CORRECTION

PATENT NO. : 5,255,567
DATED : October 26, 1993
INVENTOR(S) : Katsuyuki Miyake and Tomoyoshi Sawada It is certified that error appears in the above-identified patent and that said Letters Patent is hereby corrected as shown below:

On the Title Page:

Please add the following Assignee--Kubota Corporation, Osaka, Japan--.

Signed and Sealed this

Second Day of August, 1994

*Attest:*

BRUCE LEHMAN

*Attesting Officer*  Commissioner of Patents and Trademarks